Figure 1:
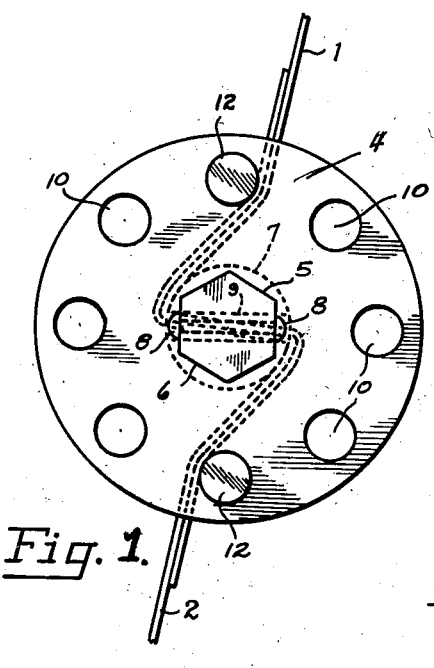

June 23, 1953 W. A. MEIGHAN ET AL 2,642,639
FLANGE TENSIONING AND JOINING DEVICE FOR STRAP ENDS
Filed Sept. 15, 1950

Inventors
William A. Meighan
and Tirey L. Hume
By
Atty.

Patented June 23, 1953

2,642,639

UNITED STATES PATENT OFFICE 2,642,639

FLANGE TENSIONING AND JOINING DEVICE FOR STRAP ENDS

William A. Meighan and Tirey L. Hume, Portland, Oreg.

Application September 15, 1950, Serial No. 184,946

9 Claims. (Cl. 24—68)

1

This invention relates to a device for securing the ends of a metal cargo strap in overlying relationship about a piece of cargo, applying a tension to the strap loop formed thereby, and locking the loop to retain the tension and to secure the cargo against movement. The present invention is an improvement over the device disclosed in our co-pending application bearing Serial Number 166,494, filed June 6, 1950, which has now matured as Patent Number 2,611,164 dated September 23, 1952. Further, the instant application is the parent case for our divisional application bearing Serial Number 248,854, filed September 28, 1951.

One object of our invention is to provide a pair of pierced circular flanges for a cylindrical mandrel having a slotted keyway whereby one or more keeper pins may be held by the flanges to lock the ends of a metal cargo strap which is inserted through the keyway.

The conventional metal cargo strap is a flexible band of steel approximately two inches in width and $\frac{1}{16}$ to $\frac{3}{32}$ inches thick used to lash one or more pieces of cargo to a deck, hold, or carrier. It is of further utility when employed aboard cargo vessels in conjunction with a fungible cargo. Thus, when so used, the hold of the ship is divided into two or more small semiopen compartments by constructing a temporary fore-and-aft baffle bulkhead along the keel line of the hold. This baffle is most easily formed from timbers which are set on end and secured to the hull ribs with the cargo straps. Thereafter, the fungible cargo is discharged into the hold over the baffle. The timbers and straps divide the fungible mass and serve as baffles to inhibit lateral shifting thereof.

Whether a flexible cargo strap is employed in conjunction with concentrated pieces of freight or is employed in conjunction with a fungible cargo, some device must be utilized for locking the strap ends and applying a tension thereto. Our invention is directed toward an improvement in such tension and locking devices. Accordingly, we provide a cylindrical mandrel carrying a pair of spaced circular flanges having aligned holes formed about their peripheries. The mandrel is slotted intermediate the flanges to thread the ends of a cargo strap therethrough and is noncircular outboard the flanges to define two tool-engaging peripheries. A strap is wound about the mandrel by applying a pair of wrenches to the tool-engaging peripheries and turning the same. The aligned holes are circular to pass longitudinally therethrough, a

2 cylindrical locking keeper pin. The flanges themselves are formed as separate complementary pieces and secured to the mandrel by a novel structure. The resulting device is capable of locking a strap in any desired state of tension. Furthermore, the strap as well as the securing device may be used repeatedly without destroying either and the strap may be loosened or tightened at any time as desired.

A further object of our invention is to provide a cargo strap joining and tensioning device which is capable of repeated use, and which may be retightened and relocked to take up any slack which may develop due to a shift in the cargo or the articles secured.

Figure 2:
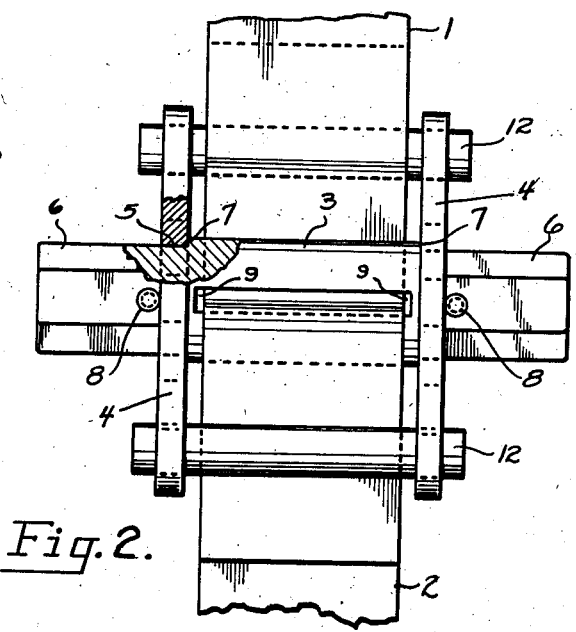

These and further objects and advantages of our invention will appear from the following detailed description taken in conjunction with the accompanying drawings, in which:

Figs. 1 and 2 are related end and plan views, respectively, (Fig. 2 being partially broken away) showing the circular flanges of our invention and the structure by which they are removably secured to the mandrel.

Referring to the drawings by reference characters, our invention is adapted to secure the respective ends 1 and 2 of a metal cargo strap in overlying relationship, as shown by full and dashed lines in Figs. 1 and 2. The principal joining and winding member therefor is an elongate cylindrical mandrel 3 carrying a pair of spaced circular flanges 4 intermediate its ends. These flanges 4 are formed as separate complementary pieces and secured to the mandrel by the structure shown in Fig. 2. Thus each flange is formed with a noncircular central cut away portion 5 which is complementary to the noncircular tool-engaging peripheries 6 which are formed on each end of the mandrel. The flanges are placed in position abutting the shoulders 7 formed by the medial portion of the mandrel and are secured against lateral movement by securing means such as the disclosed rivets or screws 8. The tool-engaging peripheries 6 and the central flange portions 5 may be any noncircular form but we prefer the hexagonal form shown in the drawings. This form adapts the mandrel to receive one or a pair of tensioning tools such as large bell crank levers or socket wrenches and secures the flanges against slippage.

The center section of the mandrel 3 carries a slotted keyway 9 intermediate the two flanges 4. This keyway is proportioned in accord with the dimensions of the flexible metal strap to be employed and, by way of example, may be 2⅛ x ¼ inches to accommodate a 2 x 1/16 inch strap. Thus, the opposite ends of the strap can be secured in overlying relationship within the slotted keyway.

In order to lock the ends of the flexible strap once the desired tension has been attained, the peripheral portions of each flange 4 carry one or more spaced keeper holes. These keeper holes are circular as shown at 10. The circular keeper hole 10 is adapted to receive a cylindrical keeper pin 12.

In the operation of our invention, the flexible strap ends 1 and 2 are threaded through the square eyes in a pair of ship clamps or cleats secured to a hull rib or the deck, are stretched laterally across the hold, and are threaded through the eyes on a piece of cargo or around a perpendicular timber baffle. Thereafter, these ends are threaded through the slotted keyway 9 in the mandrel 3 and a tensioning tool is applied to one or both ends of the mandrel over the tool-engaging peripheries 6. The mandrel is then rotated by these tools so the strap winds about the periphery of the mandrel 3 until the proper tension is produced in the strap. Thereafter, one or more of the cylindrical keeper pins 12 are inserted in their companion circular keeper holes and the tension is slacked off until the pin engages the surface of the strap to lock the same, to prevent slack being induced therein. Thus, the cylindrical keeper pin 12 is passed longitudinally through two of the circular keeper holes 10 and is held in place by frictional contact therewith. It is obvious that these keeper pins and keeper holes may be formed in any polygonal or circular shape. Accordingly, the scope of our invention is commensurate with any such diverse configurations.

In accord with the objects of our invention, we have provided a flange tensioning and joining device with which a cargo may be quickly and effectively secured against relative movement yet which may be quickly released to unload the cargo or take up any slack which may have developed due to a shift in the cargo. Furthermore, we have provided a slotted cylindrical mandrel carrying a pair of spaced circular flanges having aligned holes formed about their peripheries. These aligned holes are circular to pass longitudinally a cylindrical locking keeper pin. Further, the flanges are formed as separate complementary pieces and secured against lateral movements by a novel securing means and shoulder construction. The tensioning and securing device may be locked in any desired state of tension and both the strap and securing device may be used repeatedly without destroying either.

We claim:

1. A single spool device for locking the ends of a flexible strap in overlying relationship and applying tension thereto, comprising an elongate mandrel carrying a pair of spaced flanges adjacent the ends thereof, each end of said mandrel defining a non-circular portion and each of said flanges being pierced by a complementary non-circular aperture which slidably encompasses the corresponding non-circular portion of the mandrel, a slotted keyway in said mandrel for threading both ends of a strap therethrough, the peripheries of said flanges being pierced by a plurality of aligned keeper holes, and a complementary keeper pin, a pair of aligned keeper holes removably retaining said keeper pin when the latter is arranged in said pair of keeper holes.

2. A single spool device for locking the ends of a flexible strap in abutting and overlying relationship and for applying a tension thereto, comprising an elongate mandrel having a non-circular portion adjacent each end thereof, each said portion carrying one of a pair of spaced flanges, each said flange having a central cut away portion complementary to said non-circular portion and slidably fitted thereover, a slotted keyway in said mandrel for threading both ends of a strap therethrough, the peripheries of said flanges carrying a plurality of aligned circular keeper holes, and one or more elongate keeper pins arranged parallel to the longitudinal axis of said mandrel in restrained movable relationship in selected aligned keeper holes, the length of each keeper pin exceeding the spacing of said flanges whereby the pin protrudes from said holes to aid insertion and removal of the same.

3. A single spool device for arranging both ends of a flexible strap in abutting, overlying relationship and for securing the arranged strap against inadvertent displacement, said device comprising: an elongated cylindrical mandrel terminating at each end in an integral non-circular tool engaging periphery, the junction of said mandrel cylindrical portion and non-circular portion defining a shoulder, a pair of circular flange plates each having two faces with a non-circular aperture piercing the central portion thereof from face to face, said non-circular peripheries and apertures being of complementary configuration, one of said flange plates being mounted upon each end of said mandrel with one face in contact with said shoulder and with the aperture thereof encompassing the corresponding non-circular periphery to prevent relative rotation between the flange and mandrel, a securing means joined to each end of said mandrel, each said securing means being in contact with that face of one flange which is opposite to the face contacting said shoulder, and means carried by the portion of said mandrel intermediate said flanges threadably for receiving both ends of a flexible strap in abutting, overlying relationship.

4. A single spool device for arranging both ends of a flexible strap in abutting, overlying relationship and for tightening and then securing the arranged strap against inadvertent displacement, said device comprising: an elongate cylindrical mandrel terminating at each end in an integral non-circular tool engaging periphery, the junction of said mandrel cylindrical portion and non-circular portion defining a shoulder, a pair of circular flange plates each having two faces with a non-circular aperture piercing the central portion thereof from face to face, said non-circular peripheries and apertures being of complementary configuration, one of said flange plates being mounted upon each end of said mandrel with one face in contact with said shoulder and with the aperture thereof encompassing the corresponding non-circular periphery to prevent relative rotation between the flange and mandrel, a securing means joined to each end of said mandrel, each said securing means being in contact with that face of one flange which is opposite to the face contacting said shoulder, means carried by the portion of said mandrel intermediate said flanges threadably for receiving both ends of a flexible strap in abutting, overlying relationship, a plurality of keeper holes piercing the outer periphery of each said flange, each of said keeper holes being aligned laterally with a corresponding keeper hole in the opposite flange, and an elongate keeper pin adapted slidably to rest within two such aligned keeper holes to secure the overlying strap ends against displacement.

5. A single spool device for securing both ends of a flexible strap in abutting, overlying relationship; for tensioning the strap thus secured; and for detachably securing the tensioned strap against inadvertent displacement or loosening; said device comprising: an elongate cylindrical mandrel terminating at each end in an integral non-circular tool engaging periphery element, a pair of circular flange plate elements each having a non-circular aperture piercing the central section thereof, said non-circular peripheries and non-circular apertures being complementary and mated one to another, one of said flange plate elements being carried by and mounted upon each of said periphery elements by means of the corresponding aperture therein, the complementary construction of each non-circular periphery and aperture serving to prevent relative rotation between said complementary elements, a securing means joined to each end of said mandrel, each such means bearing upon the outer face of a corresponding flange plate element to prevent lateral displacement of the latter, a slotted keyway piercing the medial portion of said mandrel intermediate said flange plates, said keyway having a slot depth exceeding twice the thickness of the flexible strap slidably to receive both ends of the strap in overlying relationship, a plurality of laterally aligned and mated keeper holes piercing the outer periphery of said flanges, and an elongate keeper pin adapted to rest within two of said aligned keeper holes and adapted to bear against one surface of said overlying strap ends, when so resting, to secure the strap against movement.

6. A device for locking the ends of a flexible strap in overlying relationship and applying tension thereto, comprising an elongated cylindrical mandrel having a slotted keyway piercing the medial portion thereof and accommodating the threading of the ends of a strap therethrough, a noncircular tool engaging periphery on each end of said mandrel for engagement therewith of a tensioning tool, a pair of flanges secured to said mandrel immediately adjacent the ends of said keyway and spaced from the terminal ends of the noncircular tool engaging peripheries at the ends of said cylindrical mandrel, each of said flanges being provided with a plurality of apertures formed therein, said apertures being arranged in a circular pattern in each flange and mating with companion apertures in the other flange, and keeper pins selectively and slidably engaging mated apertures and spanning the space between flanges, thereby, in one position, abutting with and engaging the overlying strap ends to prevent lateral separation thereof when they extend through said keyway, and resisting rotation of said device.

7. The combination with a looped flat band of a joining and tensioning device comprising a spool device having a central mandrel pierced by a slot having a cross section corresponding to that of two overlying sections of said band, and flange portions lying at the ends of said slot, said mandrel extending through said flanges and terminating in noncircular tool engaging ends, said flanges having holes piercing said flanges, respectively, the holes in said flanges mating with companion holes in the other flange, and an elongated keeper pin selectively engageable with mated holes, said keeper pin spanning the slot in said mandrel, being laterally spaced therefrom, and adapted to engage the overlying sections of said strap to prevent the lateral separation thereof and inhibit the rotation of said spool device with respect to said strap.

8. The combination with a looped flat band of a joining and tensioning device comprising a spool device having a central mandrel pierced by a slot having a cross section corresponding to that of two overlying sections of said band, and flange portions lying at the ends of said slot, said mandrel extending through said flanges and terminating in noncircular tool engaging ends, said flanges having holes piercing said flanges, respectively, the holes in said flanges mating with companion holes in the other flange, and a plurality of elongated keeper pins selectively engageable with mated holes, said keeper pins spanning the slot in said mandrel, being laterally spaced therefrom, and adapted to engage the overlying sections of said strap to prevent the lateral separation thereof and inhibit the rotation of said spool device with respect to said strap.

9. The combination with a looped flat band of a joining and tensioning device comprising a spool device having a central mandrel pierced by a slot having a cross section corresponding to that of two overlying sections of said band, and flange portions lying at the ends of said slot, said mandrel extending through said flanges and terminating in noncircular tool engaging ends, said flanges having holes piercing said flanges, respectively, the holes in said flanges mating with companion holes in the other flange, and an elongated keeper pin selectively engageable with mated holes, said keeper pin spanning the slot in said mandrel, being laterally spaced therefrom, and adapted to engage the overlying sections of said strap to prevent the lateral separation thereof and inhibit the rotation of said spool device with respect to said strap, the holes in said flanges lying in circular courses having a radius substantially greater than that of said mandrel.

WILLIAM A. MEIGHAN.
TIREY L. HUME.

References Cited in the file of this patent

UNITED STATES PATENTS

| Number | Name | Date |
|---|---|---|
| 1,024,830 | Cook | Apr. 30, 1912 |
| 1,386,918 | Westrup et al. | Aug. 9, 1921 |
| 1,403,042 | Leonard | Jan. 10, 1922 |
| 1,542,435 | Carlson | June 16, 1925 |
| 2,348,487 | McKay et al. | May 9, 1944 |

FOREIGN PATENTS

| Number | Country | Date |
|---|---|---|
| 55,151 | Switzerland | of 1911 |